United States Patent
Igarashi et al.

(10) Patent No.: US 9,225,564 B2
(45) Date of Patent: Dec. 29, 2015

(54) ON-BOARD POWER LINE COMMUNICATION SYSTEM

(75) Inventors: Yuji Igarashi, Tokyo (JP); Takashi Tamada, Tokyo (JP); Yoshitsugu Sawa, Tokyo (JP); Kazushi Shirasawa, Tokyo (JP); Takanori Matsunaga, Tokyo (JP); Hiroyuki Kumazawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/404,673

(22) PCT Filed: Jun. 21, 2012

(86) PCT No.: PCT/JP2012/065889
§ 371 (c)(1),
(2), (4) Date: Dec. 1, 2014

(87) PCT Pub. No.: WO2013/190683
PCT Pub. Date: Dec. 27, 2013

(65) Prior Publication Data
US 2015/0188739 A1    Jul. 2, 2015

(51) Int. Cl.
*H04L 25/08*    (2006.01)
*H04B 3/54*    (2006.01)
(Continued)

(52) U.S. Cl.
CPC ........... *H04L 25/085* (2013.01); *B60L 11/1809* (2013.01); *H02J 7/00* (2013.01);
(Continued)

(58) Field of Classification Search
USPC ........................................................ 701/22
See application file for complete search history.

(56) References Cited

U.S. PATENT DOCUMENTS

| 4,479,215 A | 10/1984 | Baker |
| 7,832,507 B2 | 11/2010 | Nakamura et al. |

(Continued)

FOREIGN PATENT DOCUMENTS

| CN | 101277840 A | 10/2008 |
| CN | 102100011 A | 6/2011 |

(Continued)

OTHER PUBLICATIONS

Office Action issued on May 12, 2015 in German Patent Application No. 11 2012 006 566.2 with English translation.

(Continued)

*Primary Examiner* — Thomas Tarcza
*Assistant Examiner* — Alex C Dunn
(74) *Attorney, Agent, or Firm* — Oblon, McClelland, Maier & Neustadt, L.L.P.

(57) ABSTRACT

An on-board power line communication system that performs power line communication during charging and discharging of a battery prevents electromagnetic wave leakage from a power line from interfering with other on-board devices. A vehicle includes a PLC communication device that performs PLC communication using a charging cable that is connected to a battery, and an interference suppressor that prevents electromagnetic wave leakage from the charging cable, which accompanies PLC communication, from interfering with the operations of an on-board electronic device. The interference suppressor reduces electromagnetic wave leakage from the charging cable by reducing the output frequency of the PLC communication device or the value of current flowing through the charging cable while the on-board electronic device is performing a specific operation that will be affected by interference from PLC communication.

20 Claims, 12 Drawing Sheets

(51) Int. Cl.
*H02J 7/00* (2006.01)
*B60L 11/18* (2006.01)
*H04B 3/06* (2006.01)
*H04B 3/46* (2015.01)

(52) U.S. Cl.
CPC .............. *H02J 7/0004* (2013.01); *H04B 3/06* (2013.01); *H04B 3/46* (2013.01); *H04B 3/542* (2013.01); *H04B 3/548* (2013.01); *H04B 2203/547* (2013.01); *H04B 2203/5425* (2013.01); *H04B 2203/5445* (2013.01)

(56) References Cited

U.S. PATENT DOCUMENTS

| | | | |
|---|---|---|---|
| 7,920,585 B2 | 4/2011 | Mizutani | |
| 8,635,269 B2* | 1/2014 | LaFrance | 709/203 |
| 8,655,553 B2* | 2/2014 | Nojima et al. | 701/49 |
| 8,768,561 B2* | 7/2014 | Smith et al. | 701/29.1 |
| 2008/0185197 A1 | 8/2008 | Nakamura et al. | |
| 2009/0016545 A1 | 1/2009 | Stelliga et al. | |
| 2009/0139781 A1* | 6/2009 | Straubel | 180/65.1 |
| 2011/0112719 A1* | 5/2011 | Marumoto et al. | 701/35 |
| 2011/0225105 A1* | 9/2011 | Scholer et al. | 705/412 |
| 2011/0307123 A1 | 12/2011 | Abe et al. | |
| 2013/0342008 A1* | 12/2013 | Takata et al. | 307/9.1 |
| 2014/0333262 A1* | 11/2014 | Ochiai et al. | 320/109 |

FOREIGN PATENT DOCUMENTS

| | | |
|---|---|---|
| CN | 102381261 A | 3/2012 |
| JP | 2004-197649 A | 7/2004 |
| JP | 2004-215038 A | 7/2004 |
| JP | 2006-262570 A | 9/2006 |
| JP | 2007-116258 A | 5/2007 |
| JP | 2007-151214 A | 6/2007 |
| JP | 2008-182363 | 8/2008 |
| JP | 2009-188728 | 8/2009 |
| JP | 2010-62766 A | 3/2010 |
| JP | 2010-93957 | 4/2010 |
| JP | 2012-138735 | 7/2012 |
| JP | 2012-161235 | 8/2012 |
| JP | 2013-26953 | 2/2013 |

OTHER PUBLICATIONS

International Search Report issued Jul. 17, 2012 in PCT/JP2012/065889 filed Jun. 21, 2012.
International Preliminary Report on Patentability and Written Opinion issued Dec. 31, 2014 in PCT/JP2012/065889 (with English language translation).
Office Action issued Jun. 30, 2015 in Japanese Patent Application No. 2014-521170 (with English translation).
Chinese Office Action dated Sep. 25, 2015 for Chinese Patent Application No. 201280074106.5 and English translation of relevant portions thereof.

* cited by examiner

ON-BOARD POWER LINE COMMUNICATION SYSTEM

TECHNICAL FIELD

The present invention relates to a power line communication system that uses a cable (power line) connected to an on-board battery as a communication line, and in particular relates to countermeasures against electromagnetic wave leakage from the power line.

BACKGROUND ART

Electric vehicles that use electricity as a power source have come into practical use in recent years from the viewpoint of reducing carbon dioxide emission and increasing energy use efficiency. Following this, infrastructure for charging electric vehicles is beginning to be set up in various places. It takes a considerable amount of power, in the order of a dozen or so kilowatt-hours, to fully charge the battery of an electric vehicle (2-3 days worth of power when converted to the average electric power consumption of an ordinary household). Thus, the task is to enhance the functions of power supply facilities (grid) for electric vehicles, such as load adjustment and power distribution control.

In view of this, technology called Vehicle-to-Grid (V2G) or Vehicle-to-Home (V2H) has been proposed, in which power supply infrastructure such as power plants is connected through communication to electric vehicles, and the power supply facility performs battery charge processing that is most suitable to the amount of electric power that can be supplied from the power supply facility, and bills and settles payments in accordance with the amount of electric power used to charge the electric vehicle. For example, Patent Document 1 below proposes a power supply system in which power line communication (hereinafter, referred to as "PLC communication") using a charging cable of an on-board battery is used to notify power supply infrastructure of user information that indicates the user to be billed for battery charging, and to bill the user according to the amount of electric power charged.

In recent years, a next-generation electric power network called a "smart grid" that incorporates an auto-controller for controlling supply and demand of electric power has also been attracting attention. An electric power network managed by a smart grid focuses not only on charging the on-board battery (supplying power from the grid to the vehicle) but also actively discharging the on-board battery (supplying power from the vehicle to the grid).

PRIOR ART DOCUMENT

Patent Document

Patent Document 1: Japanese Patent Application Laid-open No. 2006-262570

SUMMARY OF INVENTION

Problems to be Solved by the Invention

With the expanded functionality of automobiles, it has become common to install various types of electronic devices on a vehicle in recent years. One example is a vehicle door lock system called "Smart Entry." With this system, typically a user (driver) with a portable key that has a wireless communication function presses a button for locking or unlocking the vehicle to lock or unlock the doors. When the user has pressed the button for locking or unlocking the vehicle, a wireless communication device mounted on the vehicle authenticates the portable key through wireless communication, and the doors are locked or unlocked if the portable key is properly authenticated.

Meanwhile, in PLC communication using the charging cable of the battery, electromagnetic wave leakage from the charging cable may interfere with the operations of other electronic devices. There is thus concern that some sort of problem might occur in the operations of other electronic devices during battery charging if PLC communication is continuously performed during charging. In the "Smart Entry" vehicle door lock system, for example, wireless communication between an on-board wireless communication device and the portable key uses a low frequency band (of approximately several hundred hertz) that is sensitive to noise, and is thus considered to be susceptible to interference from electromagnetic wave leakage. It is thus thought that problems such as not being able to open the doors during battery charging could occur if PLC communication is continuously performed during battery charging.

The present invention has been made in order to solve such problems, and it is an object of the present invention to reduce the possibility that electromagnetic wave leakage from a power line will interfere with other on-board devices in an on-board power line communication system that performs power line communication during battery charging and discharging.

Means for Solving Problems

An on-board power line communication system according to a first aspect of the present invention includes a power line communication device that performs communication using a power line that is connected to an on-board batter, and an interference suppressor that, upon detecting that an on-board electronic device is to perform a specific operation, controls at least one of an output of the power line communication device and a value of current flowing through the power line during the specific operation to reduce electromagnetic wave leakage from the power line.

An on-board power line communication system according to a second aspect of the present invention includes a power line communication device that performs communication using a power line that is connected to an on-board battery, and an interference suppressor that detects transmission or reception of a specific type of information to or from the power line communication device, and while the specific type of information is being transmitted or received, controls at least one of an output of the power line communication device and a value of current flowing through the power line in a range in which the power line communication is not interrupted, to reduce electromagnetic wave leakage from the power line.

Advantageous Effects of the Invention

The on-board power line communication system according to the first aspect of the present invention eliminates the possibility that electromagnetic wave leakage from the power line will interfere with the operations of the on-board electronic device, thus preventing the on-board electronic device from operating erroneously during charging and discharging of the battery.

The on-board power line communication system according to the second aspect of the present invention is able to suppress electromagnetic wave leakage from the power line without interrupting communication of important information such as billing and payment information. The on-board power line communication system that does not interrupt communication is applicable to an existing billing and payment system, and can realize a billing and payment system for electric power used to charge electric vehicles at a relatively low cost.

These and other objects, features, aspects and advantages of the present invention will become more apparent from the following detailed description of the present invention when taken in conjunction with the accompanying drawings.

DESCRIPTION OF EMBODIMENTS

Embodiment 1

Figure 1:
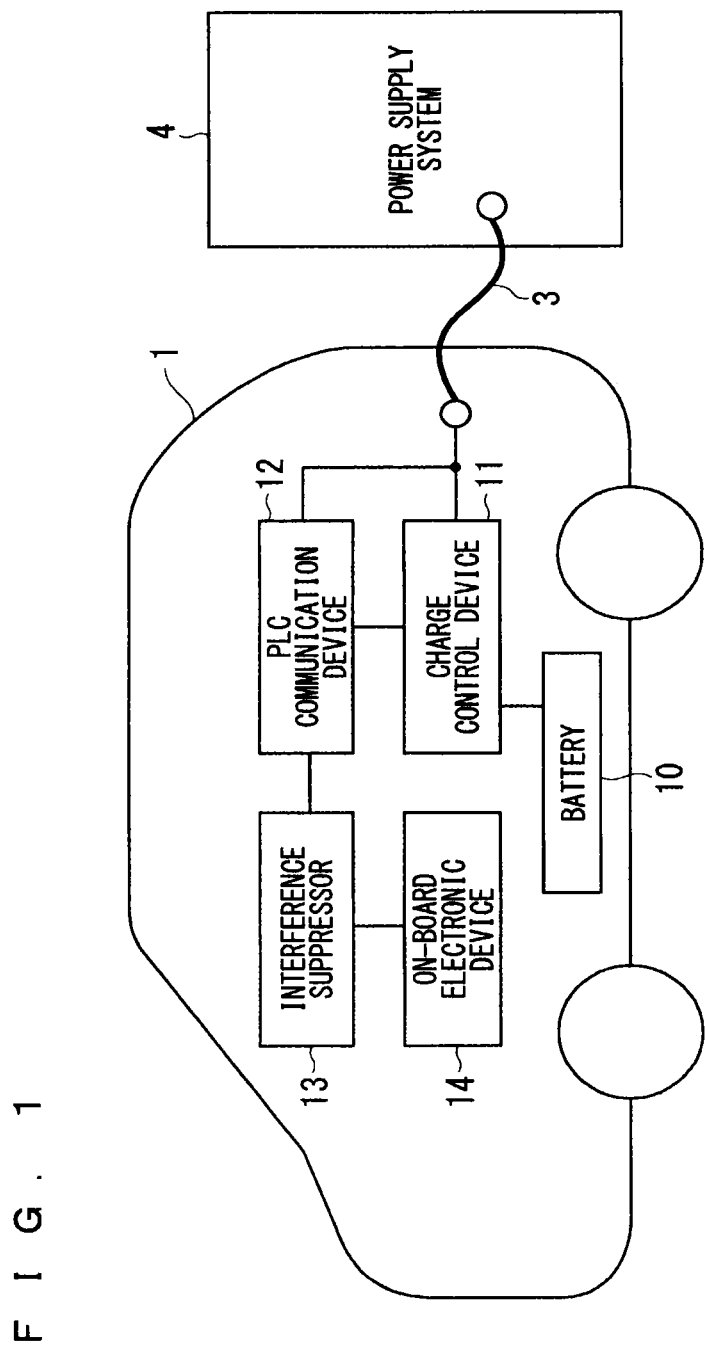
FIG. 1 illustrates a configuration of a battery charging system according to Embodiment 1.

FIG. 1 illustrates a configuration of a battery charging system according to the present embodiment. In the battery charging system, a vehicle 1 is an electric vehicle and includes a battery 10, a charge control device 11, a PLC communication device 12, and an interference suppressor 13. The vehicle 1 is connected to a power supply system 4 via a charging cable 3 during charging of the battery 10.

The PLC communication device 12 performs PLC communication with the external power supply system 4 through the charging cable 3. Information that is transmitted from the vehicle 1 to the power supply system 4 through PLC communication includes information regarding the state of the battery 10 such as the remaining amount of electric power, whereas information that is transmitted from the power supply system 4 to the vehicle 1 includes information regarding control of charge processing (e.g., an instruction to start or stop charging, and designation of the value of current during charging).

The charge control device 11 controls a charge operation of storing electric power supplied from the power supply system 4 through the charging cable 3 in the battery 10. The charge control device 11 controls the operation of charging the battery 10 in accordance with charge control information that is acquired from the power supply system 4 through PLC communication.

An on-board electronic device 14 is a vehicle door lock system, for example. The interference suppressor 13 controls operations of the PLC communication device 12 so that electromagnetic wave leakage from the charging cable 3, which is caused by PLC communication, will not interfere with operations of the on-board electronic device 14. In other words, the interference suppressor 13 monitors the operating state of the on-board electronic device 14, and upon detecting that the on-board electronic device 14 is about to perform an operation that is susceptible to interference from PLC communication, the interference suppressor 13 causes the PLC communication device 12 to temporarily stop PLC communication and gives priority to the operation of the on-board electronic device 14. This prevents electromagnetic wave leakage due to PLC communication from interfering with the operation of the on-board electronic device 14.

Figure 2:
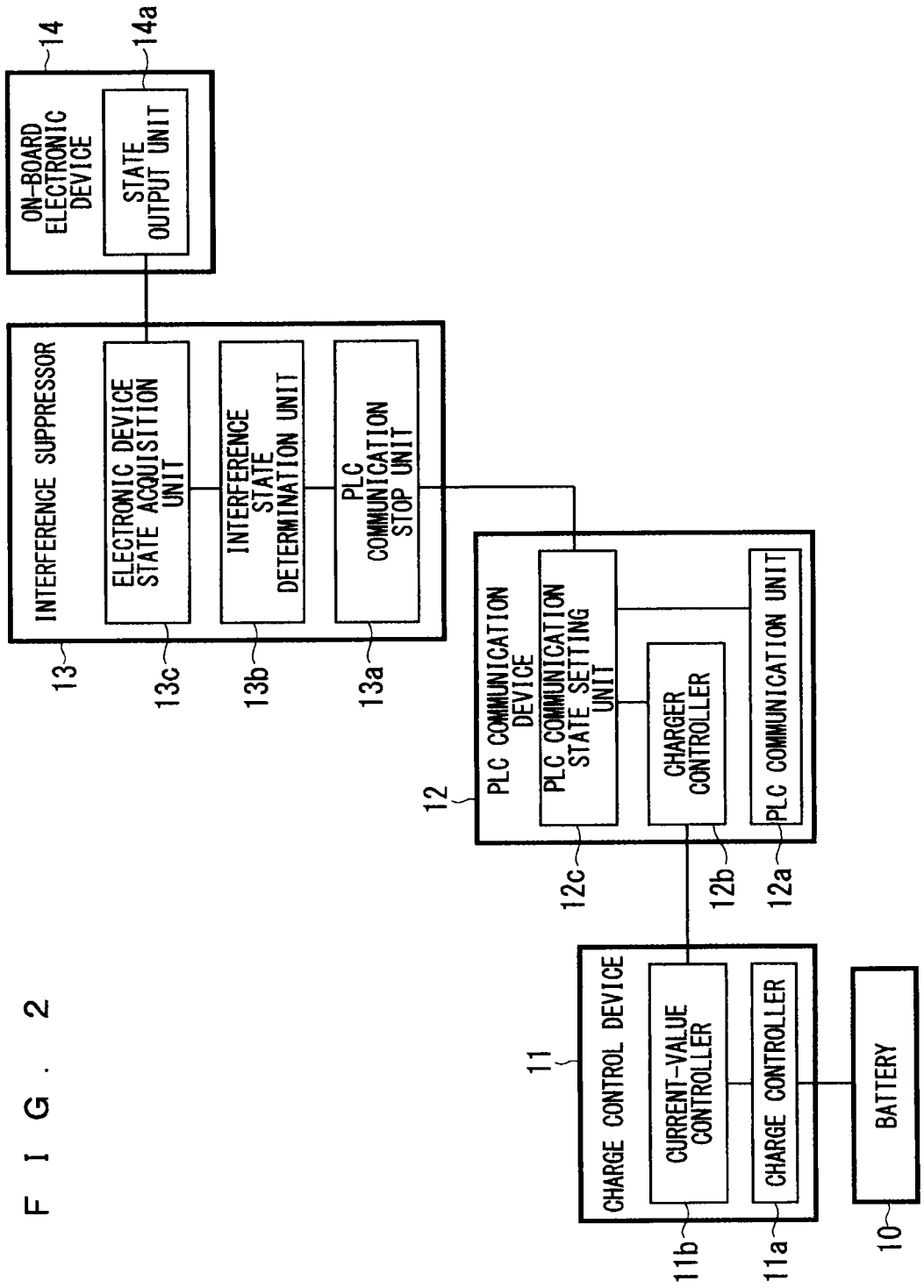
FIG. 2 is a block diagram illustrating configurations of a PLC communication device and an interference suppressor according to Embodiment 1.

FIG. 2 is a block diagram illustrating detailed configurations of the charge control device 11, the PLC communication device 12, the interference suppressor 13, and the on-board electronic device 14. As illustrated in FIG. 2, the charge control device 11 includes a charge controller 11a and a current-value controller 11b. The charge controller 11a controls a charging voltage and a charging current that are supplied to the battery 10. The current-value controller 11b controls the value of current flowing through the charging cable 3.

The PLC communication device 12 includes a PLC communication unit 12a, a charger controller 12b, and a PLC communication state setting unit 12c. The PLC communication unit 12a performs PLC communication using the charging cable 3. The charger controller 12b controls the charge control device 11 by transmitting the charge control information regarding the battery 10, which is acquired from the power supply system 4, to the current-value controller 11b of the charge control device 11. The PLC communication state setting unit 12c sets the communication state (e.g., frequencies and electric power to be used in communication, and connection/disconnection of communication) of PLC communication performed by the PLC communication unit 12a.

The interference suppressor 13 includes a PLC communication stop unit 13a, an interference state determination unit 13b, and an electronic device state acquisition unit 13c. The electronic device state acquisition unit 13c monitors operations of the on-board electronic device 14 by acquiring information regarding the operating state of the on-board electronic device 14. The interference state determination unit 13b determines whether or not the on-board electronic device 14 is about to perform an operation that is susceptible to interference from PLC communication, on the basis of the information regarding the operating state of the on-board electronic device 14, which is acquired by the electronic device state acquisition unit 13c. The PLC communication stop unit 13a causes the PLC communication device 12 to stop or resume PLC communication, on the basis of the result of the determination performed by the interference state determination unit 13b.

The on-board electronic device 14 includes a state output unit 14a that transmits information regarding the operating state of the on-board electronic device 14 to the electronic device state acquisition unit 13c of the interference suppressor 13.

Figure 3:
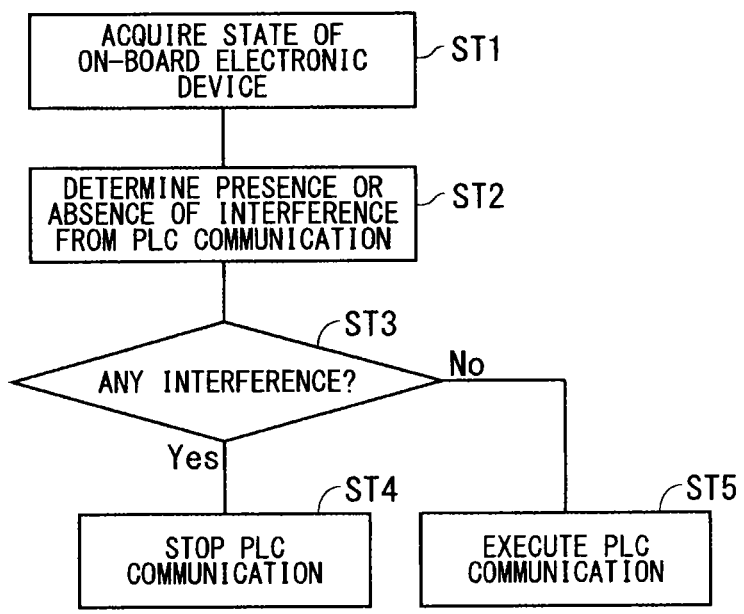
FIG. 3 is a flowchart showing operations of the interference suppressor according to Embodiment 1.

FIG. 3 is a flowchart showing operations of the interference suppressor 13. In the interference suppressor 13, when the electronic device state acquisition unit 13c has acquired the operating state of the on-board electronic device 14 (ST1), the interference state determination unit 13b determines whether or not PLC communication will interfere with the operation to be performed by the on-board electronic device 14 (ST2).

If it is determined that PLC communication will interfere with the operation to be performed by the on-board electronic device 14 (Yes in step ST3), the PLC communication stop unit 13a causes the PLC communication device 12 to stop PLC communication (ST4). If it is determined that PLC communication will not interfere with the operation to be performed by the on-board electronic device 14 (No in ST3), the PLC communication stop unit 13a causes the PLC communication device 12 to execute (resume or continue) PLC communication (ST5).

The following describes operations performed in the battery charging system according to the present embodiment, using a specific example of the on-board electronic device 14. Here, the on-board electronic device 14 is assumed to be the "Smart Entry" vehicle door lock system.

Figure 4:
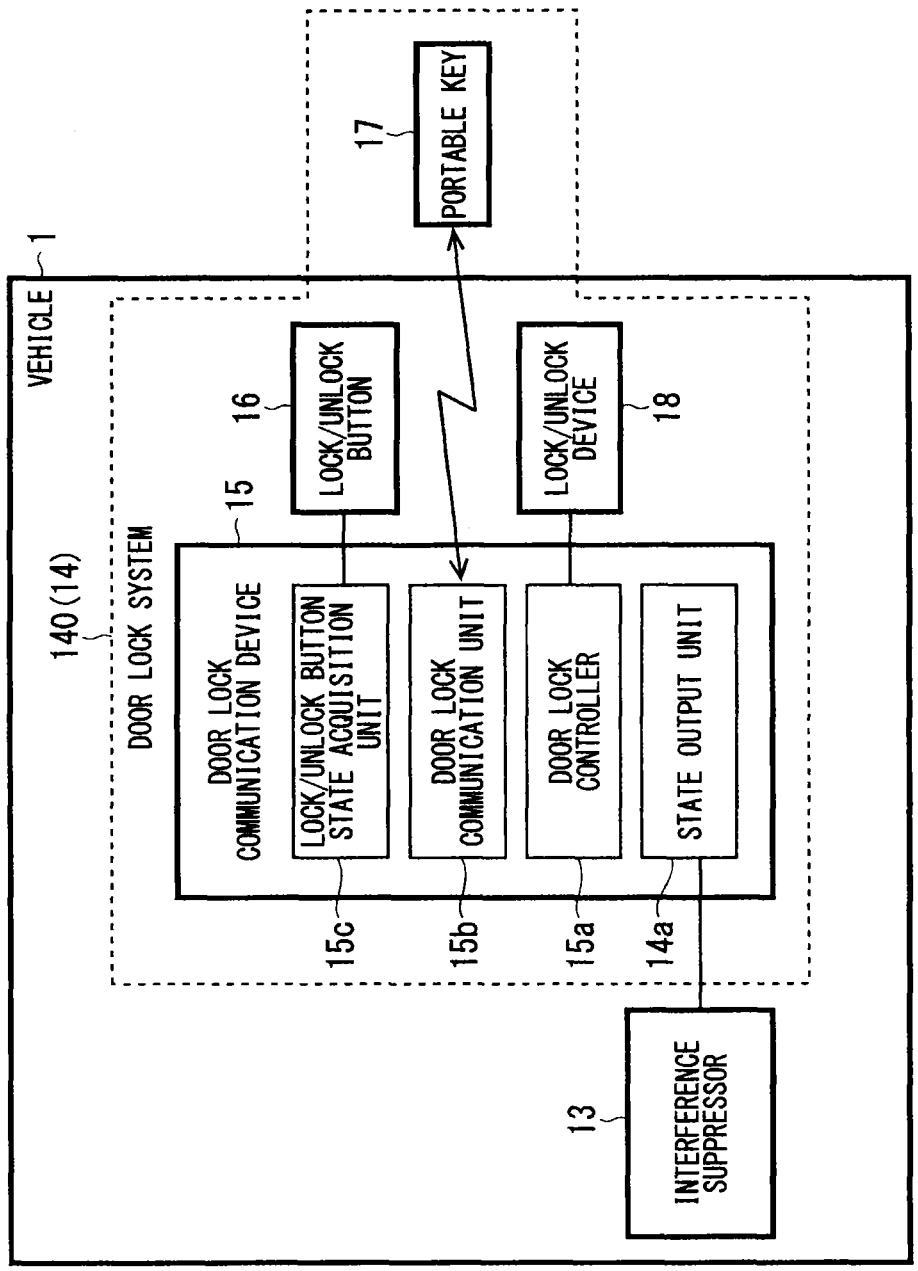
FIG. 4 illustrates a configuration of a vehicle door lock system according to Embodiment 1.

FIG. 4 illustrates a configuration of a vehicle door lock system 140 serving as the on-board electronic device 14. In FIG. 4, the battery 10, the charge control device 11, and the PLC communication device 12 of the vehicle 1 are not shown.

The vehicle door lock system 140 is constituted by a door lock communication device 15, a lock/unlock button 16, and a lock/unlock device 18 that are mounted on the vehicle 1, and a portable key 17 carried by a user (driver). In the vehicle door lock system 140, when the user with the portable key 17 has pressed the lock/unlock button 16 of the vehicle 1, the door lock communication device 15 authenticates the portable key 17 through wireless communication, and the lock/unlock device 18 unlocks or locks the doors if the portable key 17 is properly authenticated.

The door lock communication device 15 includes a door lock controller 15a, a door lock communication unit 15b, and a lock/unlock button state acquisition unit 15c. The state output unit 14a illustrated in FIG. 2 is also located in the door lock communication device 15. The door lock controller 15a controls the door lock of the vehicle 1 by transmitting an instruction to lock or unlock the doors (lock/unlock instruction) to the lock/unlock device 18. The door lock communication unit 15b authenticates the portable key 17 through interactive wireless communication with the portable key 17 and determines whether to lock or unlock the doors. The lock/unlock button state acquisition unit 15c acquires the ON (the button is pressed) or OFF (the button is not pressed) state of the lock/unlock button 16. The state output unit 14a operates to notify the interference suppressor 13 of the operating state of the vehicle door lock system 140.

Figure 5:
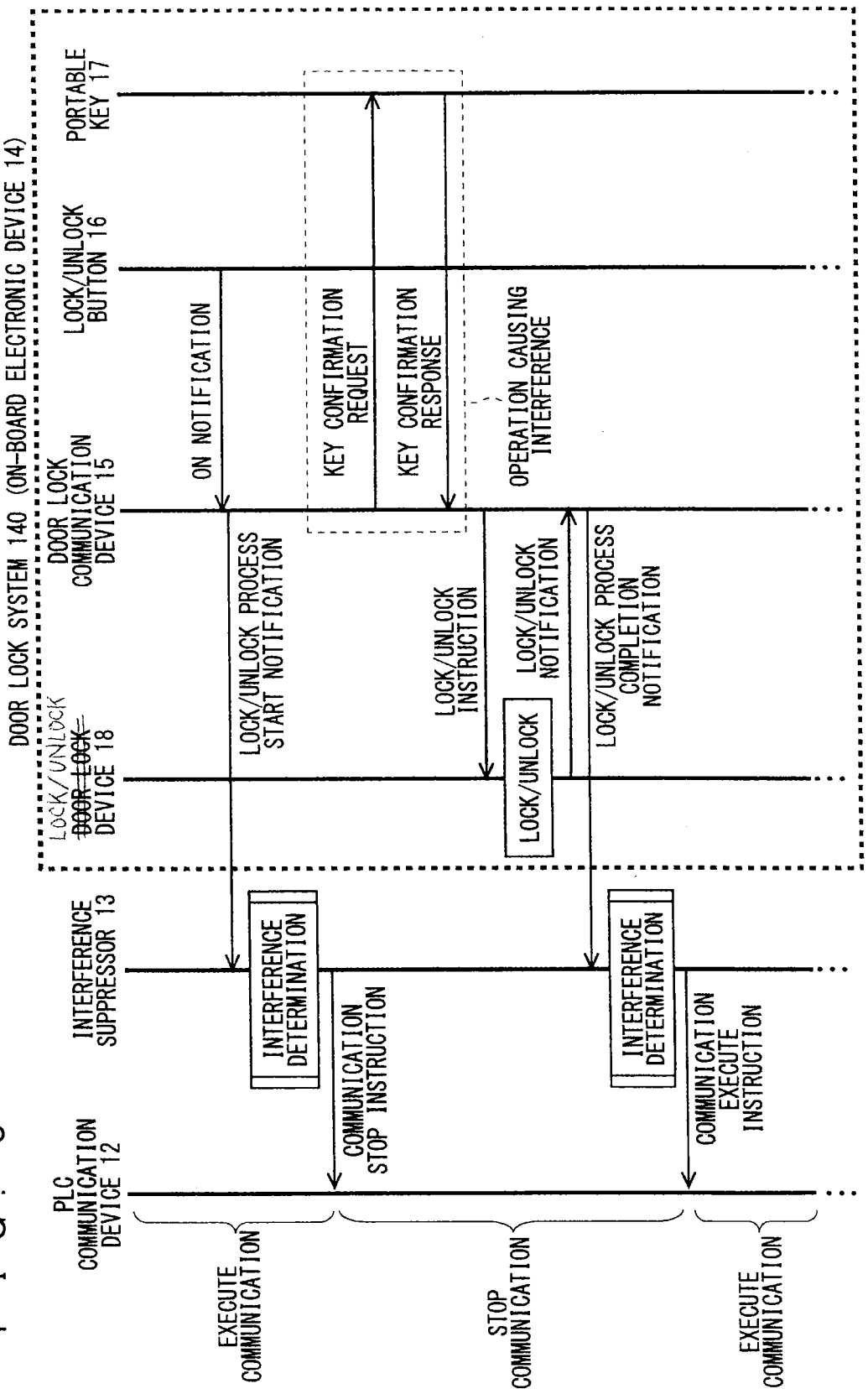
FIG. 5 illustrates a sequence of processing performed by the vehicle door lock system according to Embodiment 1.

Operations performed by the PLC communication device 12 and the interference suppressor 13 of the vehicle 1 that includes the vehicle door lock system 140 will now be described. FIG. 5 illustrates a sequence of the processing. Note that in the present embodiment, it is assumed that wireless communication between the door lock communication device 15 and the portable key 17 is prescribed as an operation that will be affected by interference from PLC communication performed by the PLC communication device 12, and that information indicating that fact is registered in advance in the interference suppressor 13. What operations of the vehicle door lock system 140 (on-board electronic device 14) will be affected by interference from PLC communication may be verified by testing or the like conducted at the stage of designing the vehicle 1, for example.

Here, assume a state in which the vehicle 1 is connected to the power supply system 4 via the charging cable 3, and the battery 10 is being charged. At this time, the PLC communication device 12 is performing PLC communication with the power supply system 4, using the charging cable 3.

If the user presses the lock/unlock button 16 in this state, a notification (ON notification) indicating that the lock/unlock button 16 has been pressed is transmitted from the lock/unlock button 16 to the lock/unlock button state acquisition unit 15c of the door lock communication device 15. In the door lock communication device 15, when the lock/unlock button state acquisition unit 15c has received the ON notification, the state output unit 14a transmits a notification indicating that processing for locking or unlocking the doors is to be started (lock/unlock process start notification) to the electronic device state acquisition unit 13c of the interference suppressor 13.

In the interference suppressor 13, when the electronic device state acquisition unit 13c has received the lock/unlock process start notification, the interference state determination unit 13b determines whether or not PLC communication will interfere with the operation of the vehicle door lock system 140 (interference determination). As described above, the lock/unlock process performed by the vehicle door lock system 140 involves wireless communication between the door lock communication device 15 and the portable key 17. In addition, the wireless communication is prescribed as an operation that will be affected by interference from the PLC communication performed by the PLC communication device 12. Accordingly, the interference state determination unit 13b determines that PLC communication will interfere with the operation of the vehicle door lock system 140. The PLC communication stop unit 13a thus transmits an instruction (communication stop instruction) to cause the PLC communication device 12 to stop PCL communication, and PLC communication temporarily stops.

Thereafter, the door lock communication unit 15b of the door lock communication device 15 transmits a confirmation (key confirmation request) as to whether or not to permit the locking or unlocking of the doors to the portable key 17 through wireless communication. The portable key 17 that has received the key confirmation request returns a response (key confirmation response) indicating that the locking or unlocking of the doors is permitted to the door lock communication unit 15b. When the door lock communication device 15 has received the key confirmation response, the door lock controller 15a transmits an instruction to lock or unlock the doors (lock/unlock instruction) to the lock/unlock device 18.

Upon receiving the lock/unlock instruction, the lock/unlock device 18 switches between locking and unlocking the doors. In other words, locked doors are unlocked, or unlocked doors are locked. The lock/unlock device 18 then transmits a notification (lock/unlock notification) indicating that the doors have been locked or unlocked, to the door lock communication device 15. Upon receiving the lock/unlock notification, the door lock communication device 15 uses the state output unit 14a to transmit a notification (lock/unlock process completion notification) indicating that the lock or unlock process has been completed, to the electronic device state acquisition unit 13c of the interference suppressor 13.

Upon receiving the lock/unlock process completion notification, the interference suppressor 13 again determines whether or not PLC communication will interfere with the operation of the vehicle door lock system 140. Since the lock/unlock process completion notification is a notification that the state output unit 14a outputs after completion of the wireless communication between the door lock communication device 15 and the portable key 17, the interference state determination unit 13b determines at this time that PLC communication will not interfere with the operation of the vehicle door lock system 140. Accordingly, the PLC communication stop unit 13a transmits an instruction (communication execute instruction) to cause the PLC communication device 12 to execute PCL communication, and PLC communication is resumed.

In the present embodiment as described above, when the on-board electronic device 14 (vehicle door lock system 140) performs an operation (wireless communication between the door lock communication device 15 and the portable key 17) that will be affected by interference from PLC communication, the interference suppressor 13 causes the PLC communication device 12 to temporarily stop PLC communication. This prevents PLC communication from interfering with the on-board electronic device 14. It is thus possible to prevent the on-board electronic device 14 from operating erroneously during charging of the battery 10.

While the example in FIG. 5 shows the configuration in which the interference suppressor 13 monitors the state of the on-board electronic device 14 and determines whether or not PLC communication will interfere with the operation to be performed by the on-board electronic device 14, the determination may be performed by the on-board electronic device 14 itself. Specifically, a configuration is also possible in which the on-board electronic device 14 determines whether or not the operation that the device itself is to perform is a predetermined operation that will be affected by interference from PLC communication, and when performing the operation that will be affected by interference from PLC communication, the on-board electronic device 14 transmits a notification indicating the result of the determination to the interference suppressor 13 (PLC communication stop unit 13a).

Embodiment 2

As described above, the battery charging system of Embodiment 1 stops PLC communication while the on-board electronic device 14 is performing an operation that will be affected by interference from PLC communication, thereby preventing PLC communication from interfering with the operation of the on-board electronic device 14.

Meanwhile, there are cases in which the content of PLC communication between the vehicle 1 and the power supply system 4 includes information that is to be used by a user (hereinafter, referred to as "HMI (human machine interface) information"), in addition to information regarding the automatic operation of charging the battery 10 such as information regarding the state of the battery 10 (e.g., the remaining amount of electric power) and charge control information (e.g., an instruction to start or stop charging, or designation of the value of current during charging). HMI information includes important information such as billing and payment information, the communication of which is preferably not interrupted. In view of this, the present embodiment proposes a battery charging system that prevents PLC communication from interfering with operations of the on-board electronic device 14, without interrupting PLC communication of important information such as billing and payment information.

Figure 6:
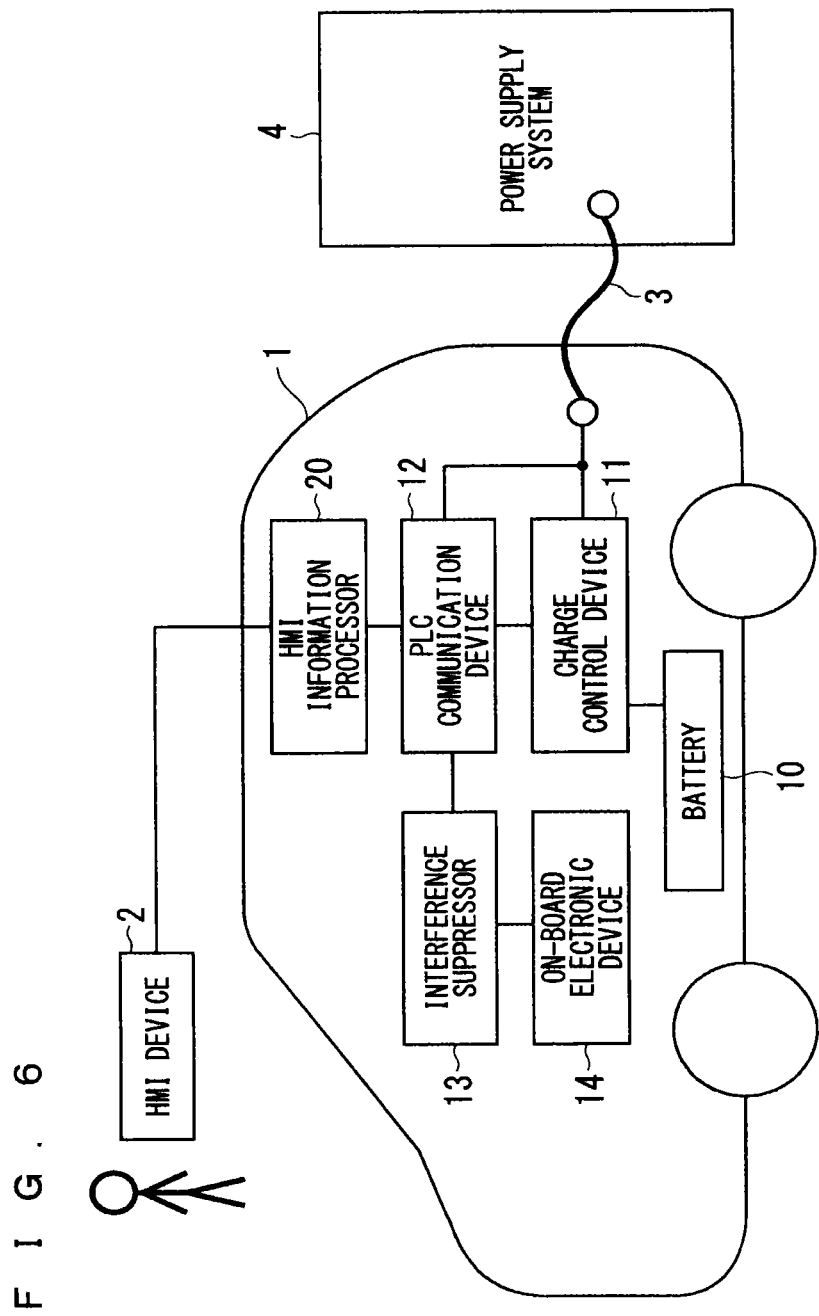
FIG. 6 illustrates a configuration of a battery charging system according to Embodiment 2.

FIG. 6 illustrates a configuration of the battery charging system according to Embodiment 2. In the configuration of this system, an HMI information processor 20 is mounted on the vehicle 1 in addition to the configuration in FIG. 1. An HMI device 2 in FIG. 6 is a device for allowing a user to input and output HMI information to and from the HMI information processor 20, and examples of existing devices as the HMI device 2 include an IC card reader and a mobile phone. As will be described later, the HMI information processor 20 also functions as another interference suppressor that prevents electromagnetic wave leakage caused by PLC communication from interfering with operations of the on-board electronic device 14.

Figure 7:
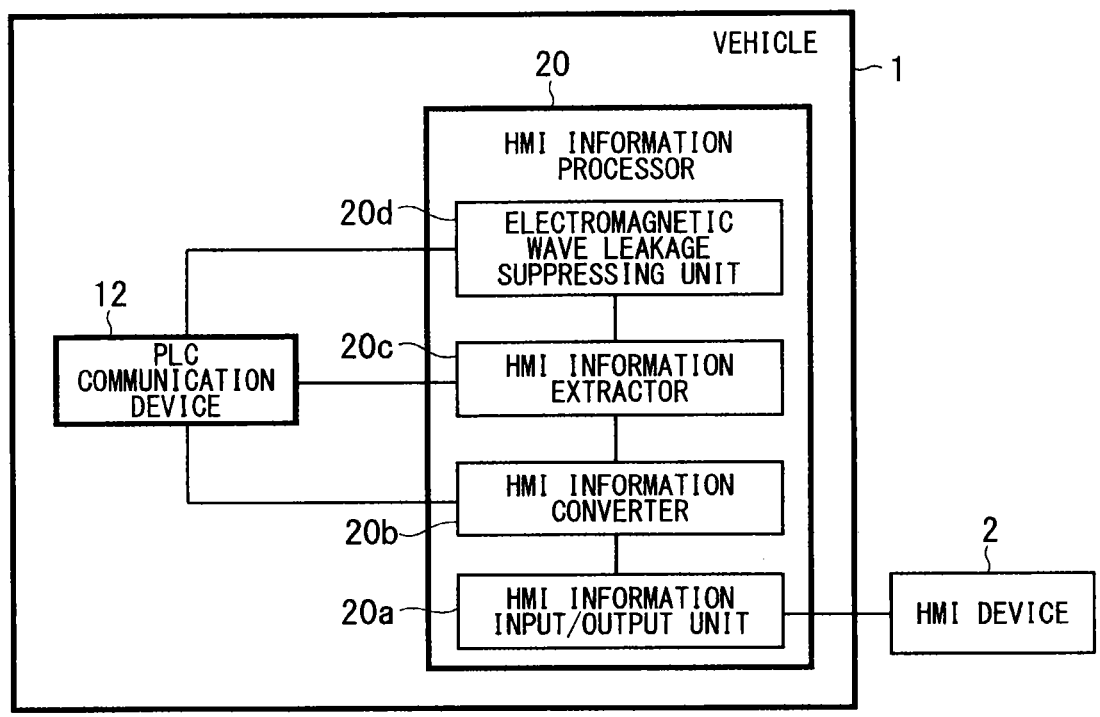
FIG. 7 is a block diagram illustrating a configuration of an HMI information processor according to Embodiment 2.

FIG. 7 is a block diagram illustrating a configuration of the HMI information processor 20. As illustrated in FIG. 7, the HMI information processor 20 includes an HMI information input/output unit 20a, an HMI information converter 20b, an HMI information extractor 20c, and an electromagnetic wave leakage suppressing unit 20d.

The HMI information input/output unit 20a exchanges HMI information with the HMI device 2. The HMI information extractor 20c extracts HMI information such as a uniform resource locator (URL) from the content of PLC communication performed by the PLC communication device 12.

The HMI information converter 20b converts the acquired HMI information into a predetermined format. In other words, the HMI information extracted from the PLC communication by the HMI information extractor 20c is converted by the HMI information converter 20b into a format that is recognizable to the HMI device 2, and is transmitted to the HMI information input/output unit 20a. Meanwhile, HMI information that the HMI information input/output unit 20a has received from the HMI device 2 is converted by the HMI information converter 20b into a format that is recognizable to the PLC communication device 12, and is transmitted to the PLC communication device 12. Through this processing, the HMI information can be exchanged between the HMI device 2 and the power supply system 4.

The electromagnetic wave leakage suppressing unit 20d suppresses electromagnetic wave leakage from the charging cable 3 without interrupting PLC communication while the PLC communication device 12 is transmitting or receiving the HMI information. As a technique for suppressing electromagnetic wave leakage from the charging cable 3 without interrupting PLC communication, there are, for example, a technique for controlling the PLC communication state setting unit 12c of the PLC communication device 12 to reduce frequencies used in PLC communication, a technique for controlling the charger controller 12b of the PLC communication device 12a to reduce the amount of current flowing through the charging cable 3, and a technique that combines the above two techniques, and any technique can be used as long as it is possible to continue PLC communication. The operation of the electromagnetic wave leakage suppressing unit 20d is given higher priority than the operation of the PLC communication stop unit 13a of the interference suppressor 13.

The following describes operations performed in the battery charging system according to the present embodiment. Note that the following description focuses on the operations of the HMI device 2 and the HMI information processor 20 since the constituent elements other than the HMI device 2 and the HMI information processor 20 in FIG. 6 are similar to those described in Embodiment 1.

In the HMI information processor 20, the HMI information extractor 20c monitors whether or not PLC communication contains HMI information while the PLC communication device 12 is performing PLC communication with the power supply system 4. For example, HMI information can be detected or extracted by searching for information having a predefined pattern, such as specific tag information described in Hypertext Markup Language (HTML) or Extensible Markup Language (XML), for example.

First is a description of operations performed by the HMI information processor 20 in the case where HMI information is transmitted from the power supply system 4 to the PLC communication device 12 through PLC communication. Upon detecting the HMI information transmitted from the power supply system 4, the HMI information extractor 20c extracts the HMI information, transmits the HMI information to the HMI information converter 20b, and transmits a notification indicating that the HMI information has been detected (HMI information detection notification) to the electromagnetic wave leakage suppressing unit 20d.

Upon receiving the HMI information detection notification, the electromagnetic wave leakage suppressing unit 20d performs processing such as reducing the frequencies used in PLC communication performed by the PLC communication device 12 or the value of current flowing through the charging cable 3 for a predetermined period of time in a range in which the PLC communication is not interrupted, in order to suppress electromagnetic wave leakage from the charging cable 3. Note that since, as described above, the operation of the electromagnetic wave leakage suppressing unit 20d is given higher priority than the operation of the PLC communication stop unit 13a, PLC communication is not interrupted by the PLC communication stop unit 13a during the above period. It is thus possible to prevent PLC communication from interfering with the operation of the on-board electronic device 14, while continuing the reception of the HMI information through PLC communication.

The HMI information converter 20b converts the HMI information extracted by the HMI information extractor 20c into a format that is recognizable to the HMI device 2, and transmits the converted HMI information to the HMI device 2 via the HMI information input/output unit 20a. The user is thus able to use the received HMI information at the HMI device 2.

Next is a description of operations performed by the HMI information processor 20 in the case where the HMI information is transmitted from the HMI device 2 to the power supply system 4 through PLC communication. In this case, the HMI information held by the HMI device 2 is input to the HMI information converter 20b via the HMI information input/output unit 20a.

The HMI information converter 20b converts the HMI information received from the HMI device 2 into a format that is recognizable to the PLC communication device 12, and transmits the converted HMI information to the PLC communication device 12. The PLC communication device 12 then transmits the received HMI information to the power supply system 4 through PLC communication.

In this case as well, the HMI information extractor 20c transmits a notification indicating that the content transmitted by the PLC communication device 12 includes the HMI information (HMI information detection notification) to the electromagnetic wave leakage suppressing unit 20d. Upon receiving the HMI information detection notification, the electromagnetic wave leakage suppressing unit 20d suppresses electromagnetic wave leakage from the charging cable 3 in a range in which PLC communication is not interrupted. It is thus possible to prevent PLC communication from interfering with the operation of the on-board electronic device 14, while continuing the transmission of the HMI information through PLC communication.

During a period in which the HMI information is neither transmitted nor received, the interference suppressor 13 performs operations similar to those described in Embodiment 1 to prevent PLC communication from interfering with the operations of the on-board electronic device 14.

Note that it is sufficient for the electromagnetic wave leakage suppressing unit 20d to perform the operation of suppressing electromagnetic wave leakage from the charging cable 3 during at least a period until the transmission and reception of each individual piece of the HMI information is completed, but if it is known in advance that a plurality of pieces of HMI information will be transmitted or received through PLC communication such as in the case of billing and payment processing, the operation of suppressing leakage may be performed continuously until the transmission and reception of all pieces of the HMI information is completed (during a period of time from the start of the billing processing to the completion of the settlement processing).

As described above, the present embodiment can achieve the effects of Embodiment 1 without interrupting PLC communication that includes HMI information, such as communication for user confirmation in the case of billing and payment, for example, or communication that require a user response. The battery charging system that does not interrupt communication of billing and payment information is applicable to an existing billing and payment system, and therefore it is possible to realize a system for billing and payment of electric power that is used to charge electric vehicles at a relatively low cost.

Embodiment 3

Figure 8:
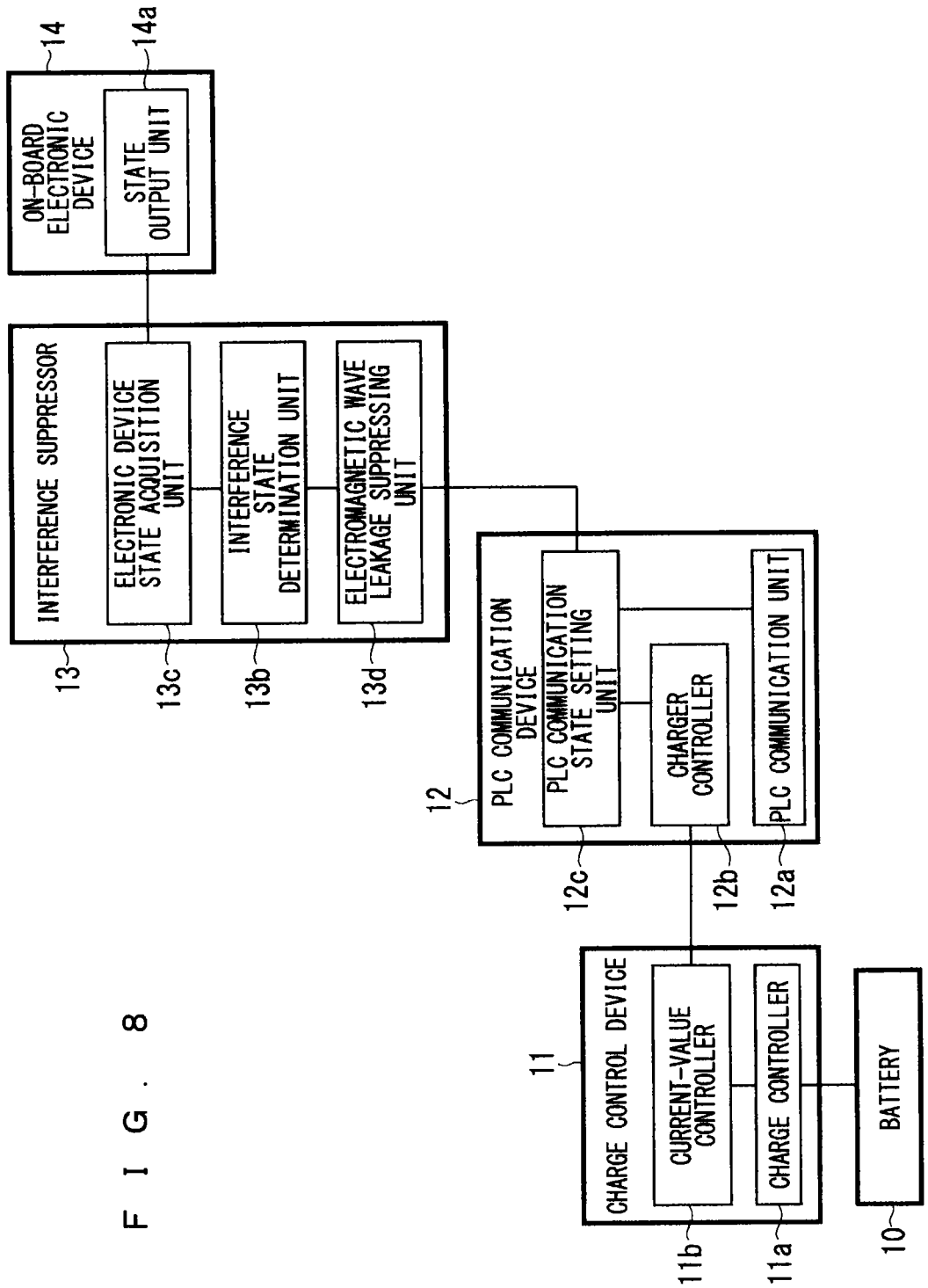
FIG. 8 is a block diagram illustrating configurations of a PLC communication device and an interference suppressor according to Embodiment 3.

FIG. 8 is a block diagram illustrating configurations of a PLC communication device and an interference suppressor according to Embodiment 3. In the present embodiment, the PLC communication stop unit 13a of the interference suppressor 13 is replaced with an electromagnetic wave leakage suppressing unit 13d.

The electromagnetic wave leakage suppressing unit 13d suppresses electromagnetic wave leakage from the charging cable 3 without interrupting PLC communication, in the same manner as the electromagnetic wave leakage suppressing unit 20d of the HMI information processor 20 described in Embodiment 2. In this case as well, as a technique for suppressing electromagnetic wave leakage from the charging cable 3, there are, for example, a technique for controlling the PLC communication state setting unit 12c of the PLC communication device 12 to reduce frequencies used in PLC communication, a technique for controlling the charger controller 12b of the PLC communication device 12a to reduce the amount of current flowing through the charging cable 3, and a technique that combines the above two techniques, and any technique can be used as long as it is possible to continue PLC communication.

While in Embodiment 1, the interference suppressor 13 prevents the occurrence of interference by stopping the PLC communication while the on-board electronic device 14 is performing an operation that will be affected by interference from PLC communication, the present embodiment can achieve effects similar to those while continuing PLC communication.

While the above-described embodiments take the example of only the case of charging the battery 10 of the vehicle 1, a next-generation electric power network called a "smart grid" also focuses on discharging the on-board battery (supplying power from the vehicle to the grid). The present invention is also applicable to a system in which PCL communication is used to discharge the battery.

Embodiment 4

The battery charging system of Embodiment 1 prevents PLC communication from interfering with an operation of the on-board electronic device 14 (i.e., wireless communication with the vehicle door lock system 140) that will be affected by interference from PLC communication, by stopping PLC communication while the on-board electronic device 14 is performing that operation. As described in Embodiment 2, one technique for suppressing electromagnetic wave leakage from the charging cable 3 is a technique for reducing the amount of current flowing through the charging cable 3.

However, electromagnetic wave leakage can also occur from devices such as an AC/DC converter that are used by the charge control device 11 of the vehicle 1 in processing for charging the battery 10. Thus, even if PLC communication is stopped or the amount of current flowing through the charging cable 3 is reduced, a case is conceivable in which electromagnetic wave leakage from the charge control device 11 will impede normal operation of the on-board electronic device 14.

In view of this, Embodiment 4 proposes a battery charging system that can more reliably ensure normal operation of the on-board electronic device 14 by stopping processing for charging the battery 10, which is performed by the charge control device 11, in addition to stopping PLC communication, while the on-board electronic device 14 is performing an operation that will be affected by interference from PLC communication.

Figure 9:
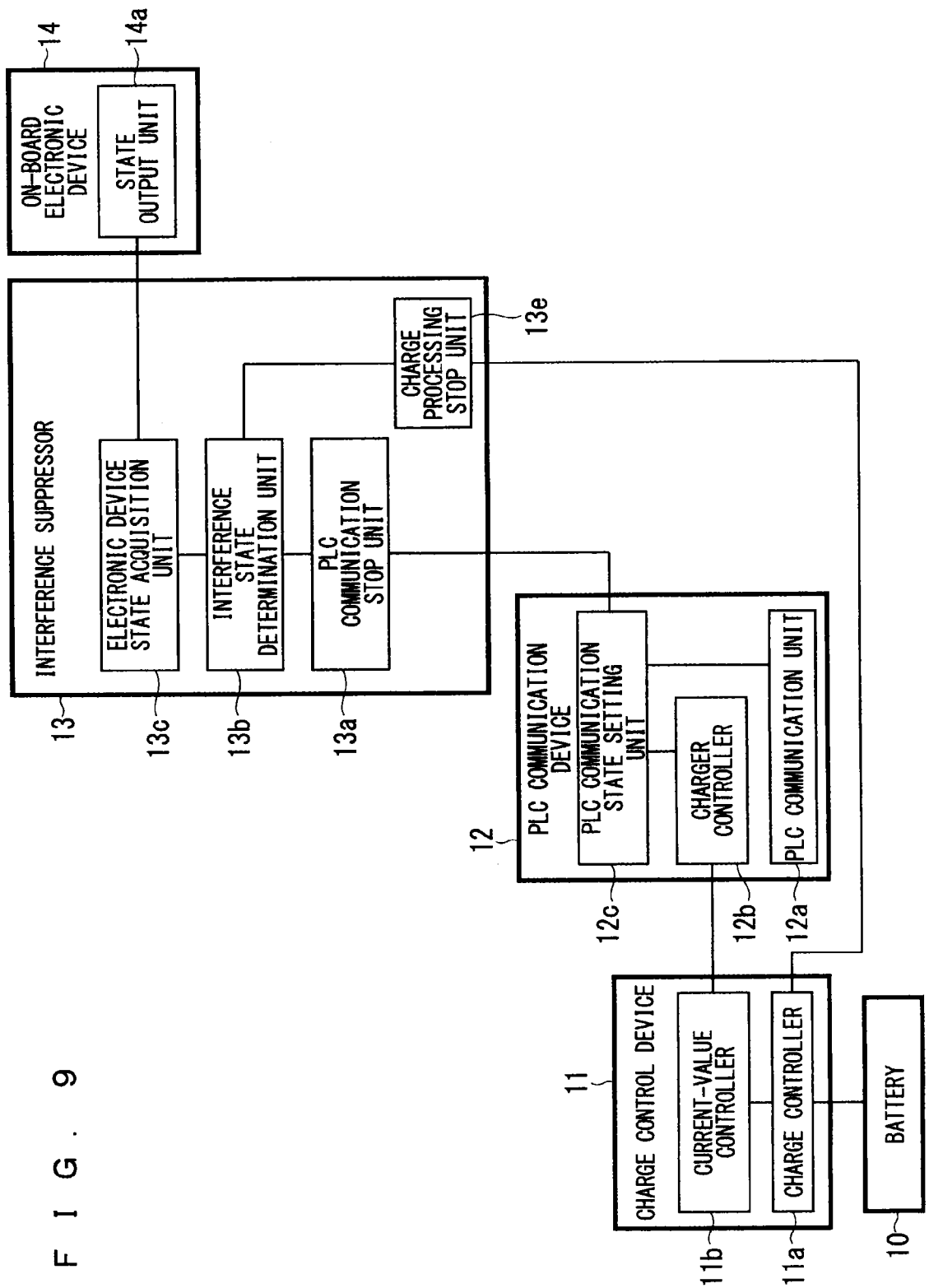
FIG. 9 is a block diagram illustrating configurations of a PLC communication device and an interference suppressor according to Embodiment 4.

FIG. 9 is a diagram for explaining the battery charging system according to Embodiment 4, and is a block diagram illustrating configurations of a charge control device 11, a PLC communication device 12, an interference suppressor 13, and an on-board electronic device 14. Note that a description of the overall configuration of the battery charging system including the power supply system 4 will be omitted because it is the same as that in FIG. 1.

As illustrated in FIG. 9, the configuration of Embodiment 4 differs from that of Embodiment 1 (FIG. 3) in that a charge processing stop unit 13e is provided in the interference suppressor 13. The charge processing stop unit 13e controls the charge controller 11a to stop or resume charge processing (e.g., AC/DC conversion), on the basis of the result of the determination performed by the interference state determination unit 13b (determination as to whether or not the on-board electronic device 14 is about to perform an operation that will be affected by interference from PLC communication).

Figure 10:
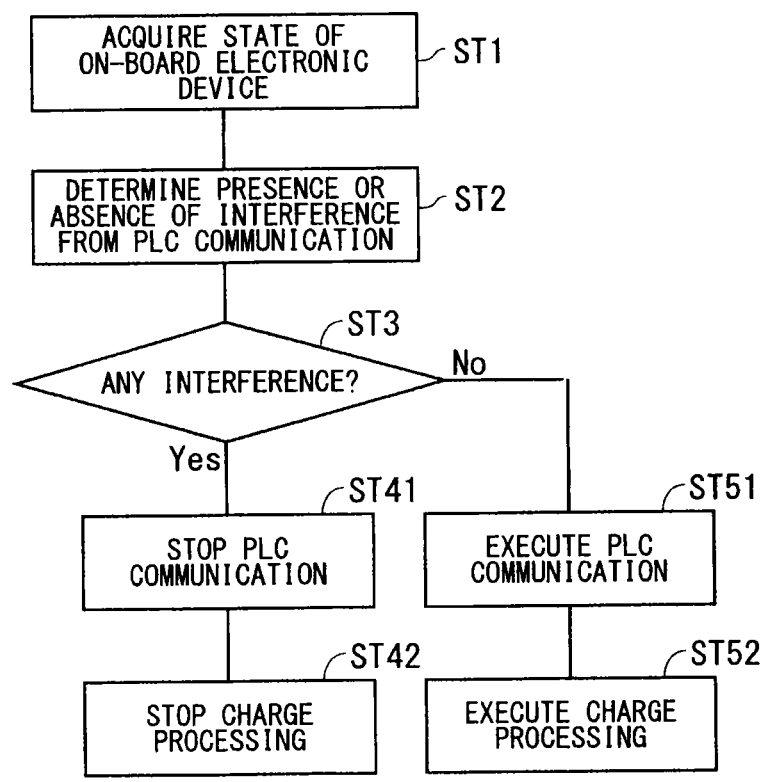
FIG. 10 is a flowchart showing operations of the interference suppressor according to Embodiment 4.

FIG. 10 is a flowchart showing operations of the interference suppressor 13 according to Embodiment 4. In the interference suppressor 13, when the electronic device state acquisition unit 13c has acquired the operating state of the on-board electronic device 14 (ST1), the interference state determination unit 13b determines on the basis of that information whether or not the operation to be performed by the on-board electronic device 14 will be affected by interference from PLC communication (ST2).

If it is determined that the operation to be performed by the on-board electronic device 14 will be affected by interference from PLC communication (Yes in step ST3), the PLC communication stop unit 13a causes the PLC communication device 12 to stop PLC communication (ST41). Then, the charge processing stop unit 13e transmits an instruction to stop charge processing (charge stop instruction) to the charge control device 11, and upon receiving that instruction, the charge controller 11a stops the charge processing for charging the battery 10 (ST42). This causes other devices that perform charge processing, such as an AC/DC converter of the charge control device 11, to stop operating, thus considerably reducing electromagnetic wave leakage from these devices. In addition, current for charging the battery 10 does not flow through the charging cable 3, and there is no electromagnetic wave leakage from the charging cable 3.

On the other hand, if it is determined that the operation to be performed by the on-board electronic device 14 will not be affected by interference from PLC communication (No in ST3), the PLC communication stop unit 13a causes the PLC communication device 12 to execute (resume or continue) PLC communication (ST51). Then, the charge processing stop unit 13e transmits an instruction to execute (resume or continue) the charge operation (charge execute instruction) to the charge control device 11, and upon receiving that instruction, the charge controller 11a executes charge processing for charging the battery 10 (ST52).

As described above, in Embodiment 4, when the on-board electronic device 14 performs an operation that will be affected by interference from PLC communication, not only is PLC communication stopped, but also charge processing performed by the charge control device 11 is stopped, and the operations of other devices as an AC/DC converter that are used in the charge processing is also stopped. This suppresses electromagnetic wave leakage due to PCL communication and charge processing while the on-board electronic device 14 is performing the operation, thus making it possible to more reliably ensure normal operation of the on-board electronic device 14.

Embodiment 5

While Embodiment 4 proposes a technique for suppressing electromagnetic wave leakage from the charge control device 11 of the vehicle 1 while the on-board electronic device 14 is performing an operation that will be affected by interference from PLC communication, electromagnetic wave leakage can also occur from the power supply system 4 that supplies electric power for charging the battery 10 to the vehicle 1. The power supply system 4 also includes devices such as an AC/DC converter that are used in processing for supplying electric power to the vehicle 1 (power supply processing), and a case is also conceivable in which electromagnetic wave leakage from those devices will impede normal operation of the on-board electronic device 14.

In view of this, Embodiment 5 proposes a battery charging system that can more reliably ensure normal operation of the on-board electronic device 14 by stopping power supply processing performed on the vehicle 1 by the power supply system 4, in addition to stopping PLC communication and charge processing that is performed by the charge control device 11, while the on-board electronic device 14 is performing an operation that will be affected by interference from PLC communication.

Figure 11:
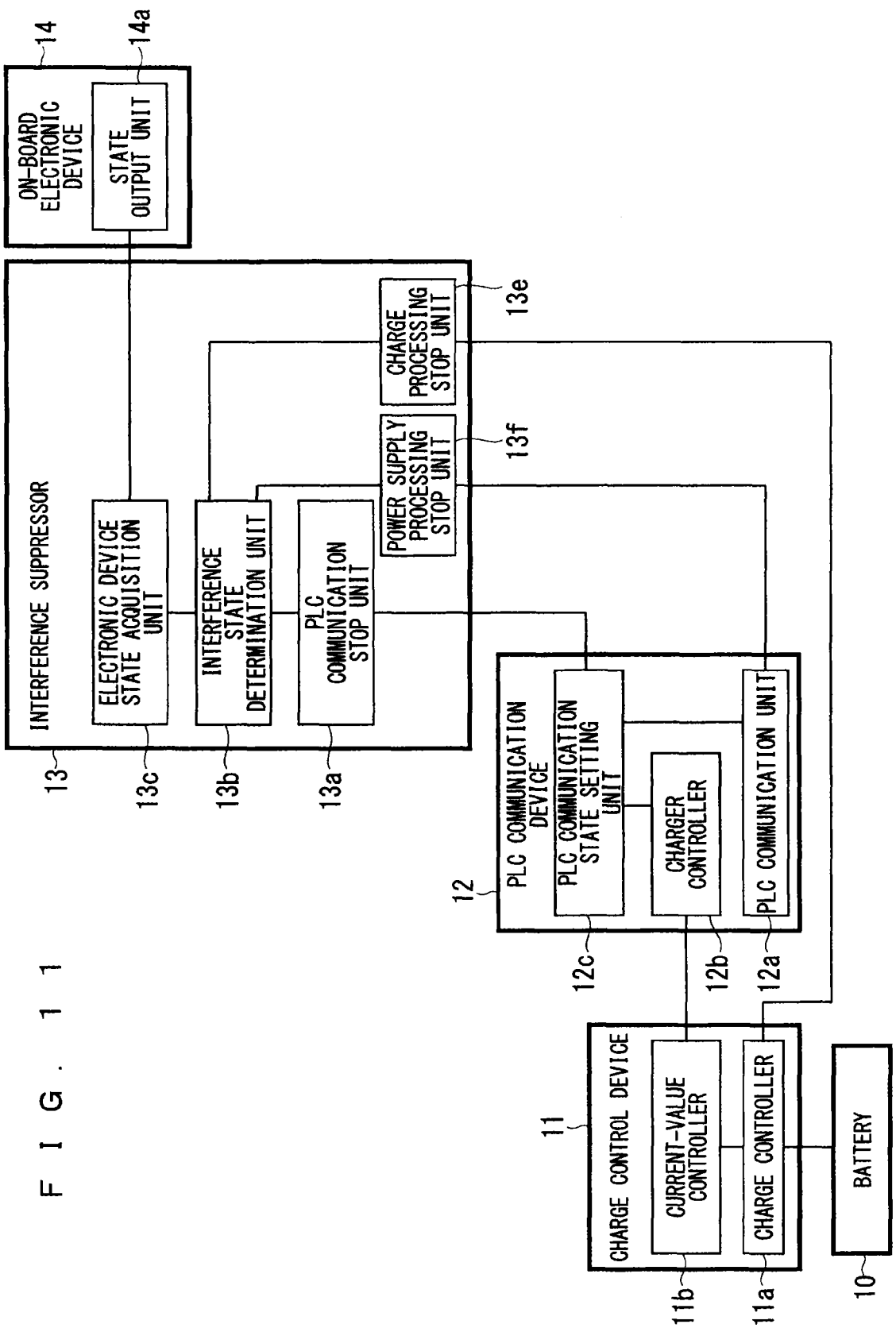
FIG. 11 is a block diagram illustrating configurations of a PLC communication device and an interference suppressor according to Embodiment 5.

FIG. 11 is a diagram for explaining the battery charging system according to Embodiment 5, and is a block diagram illustrating configurations of a charge control device 11, a PLC communication device 12, an interference suppressor 13, and an on-board electronic device 14. Note that a description of the overall configuration of the battery charging system including the power supply system 4 will be omitted because it is the same as that in FIG. 1.

As illustrated in FIG. 11, the configuration of Embodiment 5 differs from that of Embodiment 4 (FIG. 9) in that a power supply processing stop unit 13f is provided in the interference suppressor 13. The power supply processing stop unit 13f controls the power supply system 4 through PCL communication to stop or resume power supply processing (e.g., AC/DC conversion) performed on the vehicle 1, on the basis of the result of the determination performed by the interference state determination unit 13b (determination as to whether or not the on-board electronic device 14 performs an operation that will be affected by interference from PLC communication).

Figure 12:
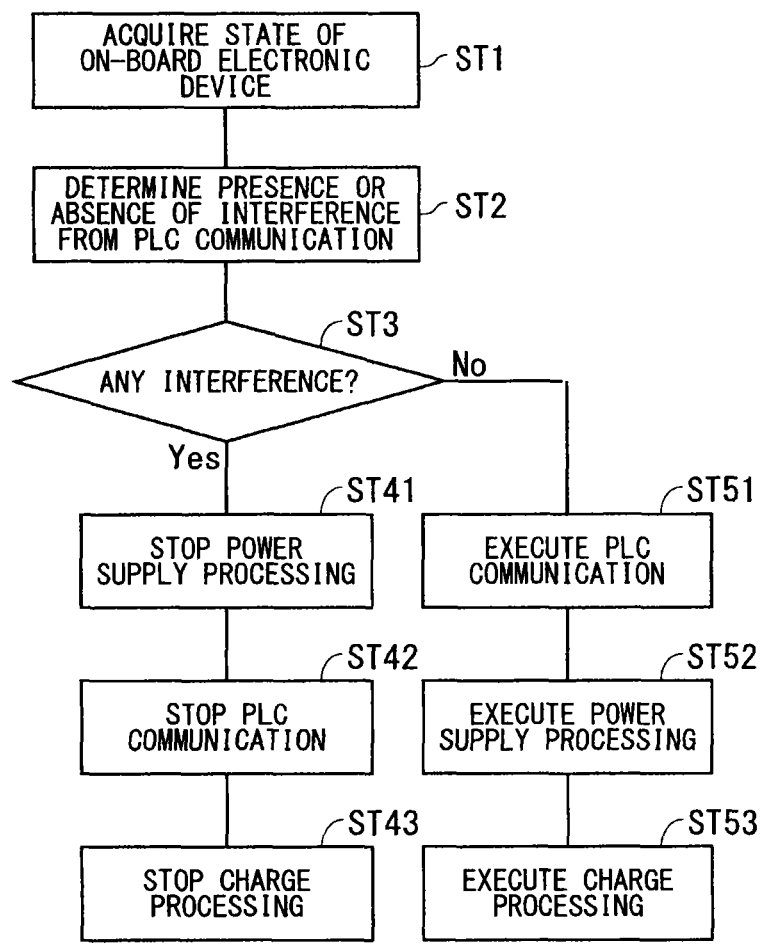
FIG. 12 is a flowchart showing operations of the interference suppressor according to Embodiment 5.

FIG. 12 is a flowchart showing operations of the interference suppressor 13 according to Embodiment 5. In the interference suppressor 13, when the electronic device state acquisition unit 13c has acquired the operating state of the on-board electronic device 14 (ST1), the interference state determination unit 13b determines on the basis of that information whether or not the operation to be performed by the on-board electronic device 14 will be affected by interference from PLC communication (ST2).

If it is determined that the operation to be performed by the on-board electronic device 14 will be affected by interference from PLC communication (Yes in step ST3), first, the power supply processing stop unit 13f transmits an instruction to stop power supply processing performed on the vehicle 1 (power supply processing stop instruction) to the power supply system 4 through PLC communication with the power supply system 4, using the PLC communication unit 12a (ST41). Upon receiving the power supply processing stop instruction, the power supply system 4 stops power supply processing performed on the vehicle 1. This also stops the operations of devices that perform the power supply processing, such as the AC/DC converter of the power supply system 4, thus considerably reducing electromagnetic wave leakage from those devices. Next, the PLC communication stop unit 13a causes the PLC communication device 12 to stop PLC communication (ST42). Then, the charge processing stop unit 13e transmits an instruction to stop charge processing (charge stop instruction) to the charge control device 11, and upon receiving that instruction, the charge controller 11a stops charge processing for charging the battery 10 (ST43). This considerably reduces electromagnetic wave leakage from the charge control device 11.

On the other hand, if it is determined that the operation to be performed by the on-board electronic device 14 will not be affected by interference from PLC communication (No in ST3), first, the PLC communication stop unit 13a causes the PLC communication device 12 to execute (resume or continue) PLC communication (ST51). Next, the power supply processing stop unit 13f transmits an instruction to execute (resume or continue) power supply processing on the vehicle 1 (power supply execution instruction) through PLC communication with the power supply system 4, using the PLC communication unit 12a (ST52). Upon receiving the power supply execution instruction, the power supply system 4 executes power supply processing on the vehicle 1. Lastly, the charge processing stop unit 13e transmits an instruction to execute (resume or continue) charging operation (charge execution instruction) to the charge control device 11, and upon receiving that instruction, the charge controller 11a executes charge processing for charging the battery 10 (ST53).

As described above, in Embodiment 5, when the on-board electronic device 14 performs an operation that will be affected by interference from PLC communication, not only are PLC communication and charge processing that is performed by the charge control device 11 stopped, but also power supply processing performed on the vehicle 1 by the power supply system 4 is stopped, and the operations of devices that are used in the power supply processing, such as the AC/DC converter, are also stopped. Since all electromagnetic wave leakages due to PCL communication, charge processing, and power supply processing are suppressed while the on-board electronic device 14 is performing the operation, it is possible to more reliably ensure normal operation of the on-board electronic device 14.

While in Embodiments 4 and 5, PLC communication is stopped as in Embodiment 1 while the on-board electronic device 14 is performing an operation that will be affected by interference from PLC communication, it is also possible, as in Embodiments 2 and 3, to employ a technique for reducing frequencies used in PLC communication to reduce electromagnetic wave leakage due to PLC communication while continuing PLC communication. In the case where PLC communication is continued, steps ST41 and ST42 may be in an arbitrary order and steps ST51 and ST52 may be in an arbitrary order in the flowchart of FIG. 12.

While the above-described embodiments take the example of the vehicle door lock system as the on-board electronic device 14, the application of the present invention is not limited thereto, and the present invention is widely applicable to various types of on-board electronic devices (e.g., a car navigation device) whose operations will be affected by electromagnetic wave leakage.

It should be noted that the present invention can be implemented by freely combining the above embodiments or by making a modification or omission to the embodiments as appropriate without departing from the scope of the present invention.

While the invention has been shown and described in detail, the foregoing description is in all aspects illustrative and not restrictive. It is therefore understood that numerous modifications and variations can be devised without departing from the scope of the invention.

REFERENCE SIGNS LIST

12 PLC communication device
13 Interference suppressor
14 On-board electronic device
15 Door lock communication device
16 Lock/unlock button
17 Portable key
18 Lock/unlock device
20 HMI information processor
11a Charge controller
11b Current-value controller
12a PLC communication unit
12b Charger controller
12c PLC communication state setting unit
13a PLC communication stop unit
13b Interference state determination unit
13c Electronic device state acquisition unit
13d Electromagnetic wave leakage suppressing unit
13e Charge processing stop unit
13f Power supply processing stop unit
14a State output unit
140 Vehicle door lock system
15a Door lock controller
15b Door lock communication unit
15c Lock/unlock button state acquisition unit
20a HMI information input/output unit
20b HMI information converter
20c HMI information extractor
20d Electromagnetic wave leakage suppressing unit

The invention claimed is:

1. An on-board power line communication system comprising:
a power line communication device that performs communication using a power line that is connected to an on-board battery; and
an interference suppressor that, upon detecting that an on-board electronic device is to perform a specific operation, controls at least one of an output of said power line communication device and a value of current flowing through said power line during the specific operation to reduce electromagnetic wave leakage from said power line.

2. The on-board power line communication system according to claim 1, wherein
said interference suppressor stops said power line communication while said specific operation is being performed.

3. The on-board power line communication system according to claim 1, wherein
said interference suppressor reduces an output frequency of said power line communication device while said specific operation is being performed.

4. The on-board power line communication system according to claim 1, wherein
said interference suppressor reduces the value of current flowing through said power line while said specific operation is being performed.

5. The on-board power line communication system according to claim 1, wherein
said specific operation is prescribed as an operation that will be affected by interference from said power line communication, and
said interference suppressor has a function of monitoring an operating state of said on-board electronic device and detecting that said specific operation is to be performed.

6. The on-board power line communication system according to claim 1, wherein
said specific operation is prescribed as an operation that is to be interfered with by said power line communication, and
said on-board electronic device has a function of, when performing said specific operation, notifying said interference suppressor that said specific operation is to be performed.

7. The on-board power line communication system according to claim 1, wherein
said interference suppressor further detects transmission or reception of a specific type of information to or from said power line communication device, and while the specific type of information is being transmitted or received, said interference suppressor controls the output of said power line communication device or the value of current flowing through said power line in a range in which said power line communication is not interrupted, to reduce electromagnetic wave leakage from said power line.

8. The on-board power line communication system according to claim 7, wherein
said interference suppressor reduces an output frequency of said power line communication device while said specific type of information is being transmitted or received.

9. The on-board power line communication system according to claim 7, wherein
said interference suppressor reduces the value of current flowing through said power line while said specific type of information is being transmitted or received.

10. The on-board power line communication system according to claim 7, wherein
said specific type of information is human machine interface (HMI) information.

11. The on-board power line communication system according to claim 1, wherein
a vehicle in which said on-board battery is mounted includes a charge control device that performs charge processing for charging said on-board battery, and
said interference suppressor stops said charge processing performed by said charge control device while said specific operation is being performed.

12. The on-board power line communication system according to claim 1, wherein
a vehicle in which said on-board battery is mounted is connected to a power supply system that performs power supply processing for supplying electric power to said vehicle via said power line, and
said interference suppressor stops said power supply processing performed by said power supply system while said specific operation is being performed.

13. The on-board power line communication system according to claim 1, wherein
said on-board electronic device is a door lock system having a smart entry function,
said specific operation is wireless communication for authentication of a key.

14. An on-board power line communication system comprising:
a power line communication device that performs communication using a power line that is connected to an on-board battery; and
an interference suppressor that detects transmission or reception of a specific type of information to or from said power line communication device, and while the specific type of information is being transmitted or received, controls at least one of an output of said power line communication device and a value of current flowing through said power line in a range in which said power line communication is not interrupted, to reduce electromagnetic wave leakage from said power line.

15. The on-board power line communication system according to claim 14, wherein
said interference suppressor reduces an output frequency of said power line communication device while said specific type of information is being transmitted or received.

16. The on-board power line communication system according to claim 14, wherein
said interference suppressor reduces the value of current flowing through said power line while said specific type of information is being transmitted or received.

17. The on-board power line communication system according to claim 14, wherein
said specific type of information is human machine interface (HMI) information.

18. The on-board power line communication system according to claim 14, wherein
a vehicle in which said on-board battery is mounted includes a charge control device that performs charge processing for charging said on-board battery, and said interference suppressor stops said charge processing performed by said charge control device while said specific type of information is being transmitted or received.

19. The on-board power line communication system according to claim 14, wherein
a vehicle in which said on-board battery is mounted is connected to a power supply system that performs power supply processing for supplying electric power to said vehicle via said power line, and
said interference suppressor stops said power supply processing performed by said power supply system while said specific type of information is being transmitted or received.

20. The on-board power line communication system according to claim 14, wherein
said transmission or reception of said specific type of information is wireless communication for authentication of a key of a door lock system having a smart entry function.

* * * * *